United States Patent [19]

Gibbs et al.

[11] Patent Number: 5,069,381
[45] Date of Patent: Dec. 3, 1991

[54] NON-CORROSIVE DOUBLE-WALLED TUBE AND PROCES FOR MAKING THE SAME

[75] Inventors: Glen A. Gibbs, Warren; Arnold T. Johnson, Davisburg, both of Mich.

[73] Assignee: ITT Corporation, New York, N.Y.

[21] Appl. No.: 525,787

[22] Filed: May 18, 1990

[51] Int. Cl.⁵ .................... B23K 31/00; B23K 101/06
[52] U.S. Cl. .................................. 228/132; 228/200;
228/220; 228/232; 228/263.15
[58] Field of Search ............... 228/126, 132, 205, 208,
228/200, 220, 232, 263.15, 263.16; 148/11.5 N

[56] References Cited

U.S. PATENT DOCUMENTS

| | | |
|---|---|---|
| 1,531,730 | 3/1925 | Bundy . |
| 1,537,404 | 5/1925 | Bundy . |
| 1,537,405 | 1/1925 | Bundy . |
| 1,650,321 | 11/1927 | Bundy . |
| 1,685,269 | 2/1928 | Bundy . |
| 1,685,270 | 7/1928 | Bundy . |
| 1,710,042 | 4/1928 | Bundy . |
| 1,720,508 | 4/1927 | Bundy . |
| 1,734,111 | 6/1927 | Bundy . |
| 1,760,038 | 7/1927 | Bundy . |
| 1,760,039 | 2/1928 | Bundy . |
| 1,761,980 | 7/1928 | Bundy . |
| 1,761,981 | 7/1928 | Bundy . |
| 1,763,755 | 6/1930 | Bundy . |
| 1,785,762 | 7/1930 | Bundy . |
| 1,827,381 | 11/1930 | Bundy . |
| 1,829,979 | 11/1930 | Bundy . |
| 1,863,874 | 12/1930 | Quarstrom . |
| 1,875,885 | 9/1929 | Quarstrom . |
| 1,895,133 | 1/1933 | Quarnstrom . |
| 1,896,350 | 1/1931 | Bundy . |
| 1,896,371 | 12/1933 | Quarnstrom . |
| 1,909,501 | 6/1933 | Quarnstrom . |
| 1,925,231 | 1/1933 | Bundy . |
| 2,014,982 | 9/1935 | Quarnstrom . |
| 2,014,983 | 9/1935 | Quarnstrom . |
| 2,018,089 | 10/1935 | Quarnstrom . |
| 3,007,810 | 12/1963 | Hobrock . |
| 3,077,661 | 2/1963 | Fromson ............................ 228/205 |
| 3,118,016 | 4/1963 | Stephenson . |
| 3,156,976 | 5/1963 | Whiting . |
| 3,220,107 | 11/1965 | Clark . |
| 3,338,761 | 3/1965 | Cheney . |
| 3,350,771 | 1/1968 | Durst . |
| 3,353,387 | 2/1968 | Johnson . |
| 3,355,795 | 12/1968 | Clark . |
| 3,382,052 | 2/1968 | Clarke . |
| 3,389,455 | 6/1968 | Clark . |
| 3,417,453 | 2/1969 | Clarke . |
| 3,434,200 | 3/1969 | Russell . |
| 3,435,504 | 3/1969 | Miller . |
| 3,457,626 | 3/1969 | Coad . |
| 4,593,446 | 6/1986 | Hayner ............................... 228/220 |

FOREIGN PATENT DOCUMENTS

| | | | |
|---|---|---|---|
| 2327318 | 5/1977 | France ............................ 228/263.16 |
| 118361 | 9/1979 | Japan ................................ 228/220 |
| 992599 | 1/1983 | U.S.S.R. ............................ 228/220 |
| 2045137 | 10/1980 | United Kingdom ................ 228/220 |

Primary Examiner—Samuel M. Heinrich
Attorney, Agent, or Firm—J. Gordon Lewis; Robert P. Seitter

[57] ABSTRACT

A process for brazing non-ferritic steel surfaces such as nickel chromium or stainless steel to which a suitable brazing alloy such as copper has been mechanically attached which includes the steps of instantaneously elevating the surface of the stainless steel to a brazing temperature while maintaining the material in a humidified gaseous atmosphere consisting essentially of a non-reactive carrier gas and a reactive gas present in sufficient concentrations to achieve fluxing; maintaining the surface temperature of the steel for an interval sufficient to permit fusion between the selected metal and the non-ferritic steel surface; after metal fusion has been achieved, allowing the resulting fused metal material to cool to a first lowered temperature in a controlled non-oxidative atmosphere at a rate which retards the formation of fine-grained steel crystals in the metal; and after reaching a metallurgical transformation point, rapidly cooling the fused metal in a controlled atmosphere to a temperature below which the brazing metal is not reactive with oxygen.

This process can be employed successfully in manufacturing unique, seamless double-walled tubing which is relatively flexible and highly corrosion resistant.

32 Claims, 1 Drawing Sheet

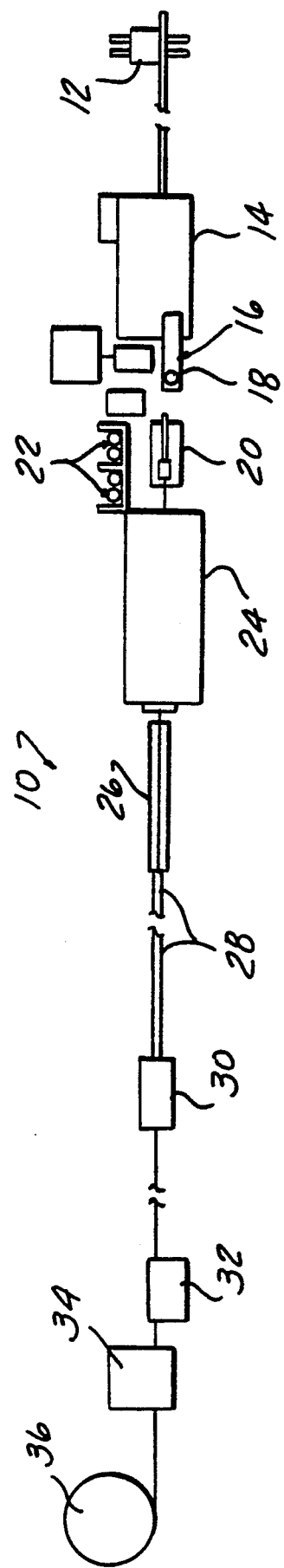

NON-CORROSIVE DOUBLE-WALLED TUBE AND PROCES FOR MAKING THE SAME

BACKGROUND OF THE INVENTION

1. Field of the Invention

This invention relates to corrosion-resistant double-walled tubes and processes for manufacturing such tubes. Double-walled tubes such as those produced by the process of the present invention are suitable for a variety of uses such as in automotive brake lines. This invention also relates to a process for brazing a selected metal to a non-ferritic steel surface.

2. Discussion of the Relevant Art

Safety standards in the automotive industry dictate that critical elements such as automotive brake lines be resistant to leakage, puncture and corrosion. In order to achieve these objectives, double-walled tubes for brake lines have been adopted as the industry standard. Such a double-walled tube consists of at least two thicknesses of a breakage-resistant metal material having sufficient properties to withstand fatigue due to prolonged vibration. The double-walled tube employed in automotive vehicles is generally referred to as "seamless", meaning that there is no seam extending the radial length of the tube wall, from the inner diameter of the tube to the outer diameter. Thus, the possibility of leakage at any joined seam is essentially eliminated. The material of choice, up to this point, has been carbon steel due to its inherent flexibility, strength and mechanical durability. A suitable brazing material such as copper or various copper alloys is plated over the surface of the carbon steel prior to formation to permit the ultimate formation of a seamless joint.

A drawback of carbon steel is its susceptibility to corrosion. In an attempt to eliminate this problem, carbon steel brake line tubes have been plated with a variety of corrosion-resistant materials, the most common of which is zinc. Zinc is plated onto the carbon steel surface of the brake line tube in a post-manufacturing process. In order to achieve sufficient corrosion resistance, plating thicknesses as great as 25 microns have been employed. Unfortunately, the zinc-plated surface is susceptible to cracks and chips due to road hazards and continued prolonged vibration. This leads to corrosion and, ultimately, to leaking of the brake line tube.

In order to alleviate this problem, zinc-plated carbon steel tubes have been further coated with high-strength polymers such as polyvinyl fluoride. Polyvinyl fluoride coatings can also crack and chip, and ultimately lead to corrosion problems. Additionally, brake lines coated with polyvinyl fluoride are difficult to dispose of or recycle once the vehicle has reached the end of its useful life.

Ideally, brake lines would be manufactured from a suitable, inexpensive non-corrosive material. However, corrosion-resistant metals such as nickel-chromium (stainless) steel are not amenable to double-walled tube manufacturing processes. Great difficulties have been encountered in imparting a copper overlay to a stainless steel surface, and it has been widely held that copper-plated stainless steel could not be metallurgically brazed.

Additionally, the forming processes for manufacturing a continuous seamless double-walled tube require the use of lubricating compounds or materials, such as milling oils, which adhere to the surfaces of the metal and interfere with achieving a uniform 360° metallurgical braze. Removal of these contaminants prior to brazing is imperative but difficult.

Thus, it would be desirable to provide a process for manufacturing seamless double-walled tubing in which contaminating lubricants can be removed or rendered harmless prior to metallurgical brazing. It is also desirable to provide a process in which a highly corrosion-resistant base metal such as non-ferritic or stainless steel can be successfully and economically employed. It is desirable to provide a process in which a selected metal alloy can be successfully metallurgically bonded to a non-ferritic steel surface. It is further desirable to provide a corrosionresistant double-walled seamless tubing suitable for use in the manufacture of automotive brake lines.

SUMMARY OF THE INVENTION

The present invention encompasses a process for brazing a selected metal alloy to a non-ferritic steel surface in which the selected metal alloy is plateable on the steel surface. In this process, the temperature of the non-ferritic steel is raised from a first temperature to a second elevated temperature and maintained at that second elevated temperature for an interval sufficient to achieve fusion between the selected metal alloy and the non-ferritic steel surface. The first temperature is less than or essentially equivalent to the volatilization temperature of lubricating materials adhering to the steel surface, if any. The second elevated temperature is sufficient to trigger fusion between the selected metal alloy and the non-ferritic steel surface. The second temperature elevation occurs in a humidified gaseous atmosphere which consists essentially of a non-reactive carrier gas and a reactive gas suitable for and in sufficient concentrations to achieve and promote fluxing.

The non-ferritic steel is maintained in contact with the humidified gaseous atmosphere at or above the second temperature for an interval sufficient to permit fusion between the selected metal alloy and the non-ferritic steel surface. After metal fusion has been achieved, the resulting fused metal material is allowed to cool to a first lowered temperature in a controlled non-oxidative atmosphere at a rate which maximizes the temperature at which metallurgical transformation of the non-ferritic steel from an austenitic to a pearlite phase occurs.

After the metallurgical transformation point has been achieved, the resulting material can be rapidly cooled in a controlled atmosphere to a temperature below which the selected metal alloy is no longer reactive with oxygen. If desired, the resulting metal material can be further quenched in a suitable aqueous medium.

Before the brazing process is begun, the process of the present invention can include the additional optional step of removing any volatile contaminants remaining on the metal surface imparted there during any metal deformation steps. In the process of the present invention, this preferably comprises the step of elevating the surface temperature of the non-ferritic steel from a preliminary temperature to the volatilization temperature. The preliminary temperature may be ambient or any intermediate temperature substantially below the volatilization temperature. The temperature elevation step proceeds in the presence of a non-oxidative atmosphere at a rate sufficient to initiate an essentially instantaneous volatilization of volatilizable solvents and carriers present in the lubricating material.

The process of the present invention can be successfully employed in a process for producing a noncorrosive seamless double-walled tube. Also included in the present invention is a non-corrosive, seamless double-walled tubing suitable for use in automotive brake lines.

BRIEF DESCRIPTION OF THE DRAWING

In the present description, reference is made to the following drawing in which FIG. 1 is a schematic view of the process of the present invention.

DESCRIPTION OF THE PREFERRED EMBODIMENT

The present invention is predicated on the unexpected discovery that a selected metal alloy such as copper or silver previously plated on a non-ferritic steel surface can be successfully fused to that surface in a brazing process. This brazing process permits the fusion of the double walls to one another, thereby producing a continuous, seamless non-corrosive metal tube.

The present invention is a process for brazing a selected metal alloy to a non-ferritic steel surface. The brazing process of the present invention comprises the following steps:

rapidly raising the temperature of the non-ferritic steel from a first temperature to a second elevated temperature sufficient to trigger fusion between the selected metal alloy and the non-ferritic steel surface, the temperature elevation occurring in a humidified gaseous atmosphere consisting essentially of a non-reactive carrier gas and a reactive gas suitable for and in sufficient concentration to achieve fluxing;

maintaining the non-ferritic steel in contact with the humidified gaseous atmosphere at the second temperature for an interval sufficient to permit fusion between the selected metal alloy and the non-ferritic steel surface;

once metal fusion has been achieved, allowing the resulting fused metal material to cool to a first lowered temperature in a controlled non-oxidative atmosphere at a rate which maximizes the temperature at which metallurgical transformation of the non-ferritic steel from an austenitic to a pearlite phase occurs; and after reaching the metallurgical transformation point, continuing cooling of the fused metal material in a controlled atmosphere to a temperature below which the selected metal alloy is not reactive with oxygen.

The humidified gaseous atmosphere employed in the first step is preferably a mixture of nitrogen with sufficient hydrogen to achieve and maintain fluxing. A suitable volumetric concentration of hydrogen would be readily discernable by one reasonably skilled in the art. In the preferred embodiment, it has been found that concentrations of hydrogen between about 50% and about 75% by volume can be successfully employed. The process of the present invention is to be construed as encompassing functional equivalents of the described gases.

The term "non-ferritic steel" as used herein is generally defined as non magnetic, nickel chrome stainless. In the preferred embodiment, the non-ferritic steel is a stainless steel consisting essentially of iron, chromium, nickel, manganese, silicon, and carbon. The amount of carbon is, preferably, limited to amounts no more than 0.03% by weight. An illustrative example of one such non-ferritic steel is set forth in Table 1.

TABLE 1

TYPICAL ANALYSIS OF A NON-FERRITIC STEEL

| Element | Percent |
| --- | --- |
| Carbon | 0.03 |
| Manganese | 7.00 |
| Silicon | 0.50 |
| Chromium | 16.75 |
| Nickel | 5.00 |
| Nitrogen | 0.07 |

The selected metal alloy is one capable of being uniformly deposited on the surface of the non-ferritic steel. The deposition process may be any suitable mechanical, chemical, or electrochemical process which will permit permanent or, at the minimum, semi-permanent mechanical adhesion of a selected metal alloy to the non-ferritic steel surface. The preferred selected metal alloys are alloys of metals such as copper, silver or any other suitable alloy. Additionally, non-alloyed metals such as copper, silver or any other suitable metal can also be successfully used in the process of the present invention.

The deposition process is, preferably, an electroplating process which can be employed successfully on non-ferritic or stainless steel which has been prepared by a Woods-nickel strike. The Woods-nickel strike imparts a Woods-nickel composition to the surface of the stainless steel. The Woods-nickel composition will mask the existing nickel-chromium oxides to permit copper plating. The plated surface is, then, rendered suitable for subsequent brazing procedures.

Where the objective is the formation of double-walled tubing, the electroplateable brazing alloy is deposited on the non-ferritic steel surface prior to formation of the double-walled tubing. The double-walled tubing can be rolled and formed by any conventional method. In order to achieve 360° brazing around the entire tube surface, the subsequent brazing steps of the present invention are employed.

In the preferred embodiment, in order to permit more effective brazing action, lubricating materials applied to the plated non-ferritic steel prior to formation of the continuous tube may be removed. The lubricating materials commonly employed in metal formation processes such as those in which a continuous metal tube is formed generally contain carbon or graphite materials suspended in a variety of volatilizable solvents and carrier materials. During conventional brazing operations, these materials are sintered into a carbonaceous material which inhibits brazing action. Without being bound to any theory, it is believed that the brazing inhibition is due to the interposition of the carbonaceous material between layers of non-ferritic steel to be brazed. The carbonaceous material acts as an insulating material inhibiting suitable heat transfer.

In the process of the present invention, the formed metal material exits formation machinery at an essentially ambient preliminary temperature with lubricating materials adhering thereto. The surface temperature of the non-ferritic steel is rapidly elevated from this preliminary temperature which is substantially below the volatilization temperature of the solvents and carriers present in the lubricating material to a temperature equal to or above the temperature at which volatilizable solvents and carriers present in the lubricating material will experience essentially instantaneous volatilization. It will be appreciated that this temperature elevation is essentially instantaneous. This unique, essentially instantaneous, temperature rise is described herein as a "shock heating" of the metal surface. It has been found that a shock heat elevation to a temperature equal to or above 900° F. will achieve the essentially instantaneous volatilization desired. In order to prevent undesired oxidation of the selected metal alloy plating, the shock heating step occurs in a non-oxidative gaseous atmosphere. The gaseous material is preferably an anhydrous non-reactive gas such as one selected from the group consisting of nitrogen, hydrogen, carbon monoxide, and mixtures thereof. The non-oxidative gaseous atmosphere permits and promotes the volatilization of the volatilizable solvents and carriers present in the lubricating compound. In the preferred embodiment, the non-oxidative gaseous atmosphere is nitrogen. However, functional equivalents of nitrogen are contemplated and considered within the scope of this invention.

Because the volatilization is essentially instantaneous, the solvents and carriers volatilize in a manner which physically drives them from the surface of the prepared metal. Where two sheets of metal overlay one another, such as in double-walled tubing, this process of rapid shock heating eliminates volatilizable solvents and carriers interposed between the two respective layers of non-ferritic steel. Heretofore, it has been almost impossible to completely eliminate such contaminants without employing complex mechanical scrubbing or removal operations. It is to be understood that in certain situations such as the formation of double-walled tubing, even such mechanical scrubbing is impossible. However, the shock heating process of the present invention permits removal of volatilizable solvents and carriers, thereby insuring a uniform 360° brazing operation.

Without being bound to any theory, it is believed that the shock heating procedure triggers an almost explosive volatilization of solvents and carriers in the lubricating material. When such shock heating is employed with double-walled tubing, the explosive force of the volatilization initiates a micro-expansion between the two respective overlaying walls. The gap between the walls created by the micro-expansion process permits the escape of volatilizable solvents and carriers. Carbon dust remains as a residue after this step is completed. The residual carbon dust does not interfere with subsequent brazing procedures. The dust can remain on the interior and various surfaces of the tubing until the brazing operation is completed. Any residual dust can be blown from the exposed surfaces upon completion of the tube formation process. In the preferred embodiment, the volatilization temperature is above the volatilization point of the solvents and carriers but below any metallurgical phase transformation point for the non-ferritic steel. This range is between about 800° F. and about 900° F.

Once volatilizable solvents and carriers have been removed from the metal surface, brazing procedures can proceed. In order to promote brazing, it is necessary to substitute the non-oxidative gaseous atmosphere used in the elevation step with an atmosphere which will support fluxing. In the preferred embodiment, the atmosphere for supporting fluxing is a mixture of nitrogen and hydrogen which has been humidified and has a dew point greater than about $-42°$ F. In the preferred embodiment, the substitution of atmospheres may occur in any convenient manner after the solvents and carriers have been volatilized, the non-ferritic steel can be exposed to ambient temperature for a brief interval during the exchange of gaseous atmospheres. Once this has been completed, the temperature of the non-ferritic steel is raised rapidly from the volatilization temperature to a second elevated temperature sufficient to trigger fusion between the selected metal or metal alloy and the non-ferritic steel surface. The term "fusion" as used herein is defined as the existence or establishment of a metallurgical bond between two dissimilar metals. This rate of temperature elevation is as rapid as possible to approximate or achieve essentially instantaneous temperature rise. This phenomenon is a second shock heating of the metal material.

The second elevated temperature to which the surface of the non-ferritic steel is elevated is a sufficient amount higher than the liquidus temperature of the selected metal plated on the non-ferritic steel to trigger and maintain the fusion process. "Liquidus temperature" is defined herein as the temperature at which a metal or metal alloy begins to enter its molten state. In the preferred embodiment, where copper is employed, the liquidus temperature of the copper is 1,980° F. The second elevated temperature is, preferably, at or above between 2,000° F. to 2,050° F. The upper maximum for the second elevated temperature is determined by both the properties of the nonferritic steel and selected metal material employed. Ideally, the upper temperature is limited to a point below thermal degradation or melting of the steel substrate and/or the degradation point of the selected metal material.

The fusion process triggered in the process of the present invention is, preferably, brazing. In the preferred embodiment, the metal material is elevated to the brazing temperature in as rapid a manner as possible. As described previously in conjunction with the solvent volatilization step, the metal is once again "shock heated" to produce a temperature rise from a point at or below the volatilization temperature of 900° F. to a point at or above the brazing temperature of between about 2,000° F. to about 2,050° F. This temperature elevation rate is sufficiently rapid to initiate brazing. The temperature rise is essentially "instantaneous". "Instantaneous temperature rise" as defined herein occurs in an interval no less than 400 degrees/second. This contrasts sharply with conventional brazing procedures in which the temperature is brought up to the brazing point in a steady controlled manner. Without being bound to any theory, it is believed that the "shock heating" helps to initiate opening of the crystal grains present in the nonferritic steel surface to permit a brazing metal such as copper to penetrate into the surface.

Once the temperature of the non-ferritic steel has been elevated to the fusion temperature, this temperature is maintained for an interval sufficient to achieve the formation of a metallurgical bond between the selected metal material and the non-ferritic steel surface. This "heat soak" phase can be defined as the time at which the material is held at the appropriate fusion temperature to permit formation of a metallurgical bond between the selected metal material and the steel surface. Without being bound to any theory, it is believed that this "soak time" continues the opening of the fine grain structure of the surface of the stainless steel initiated during the second shock heat phase permitting the bond to form. At temperatures above 2,000° F. during the heat soak phase, there is a notable precipitation of carbon; triggering and indicating a change from a martensitic to an austenitic surface. Without being bound to any theory, it is believed that this phenomenon may be necessary to achieve bond formation between a selected material such as copper and non-ferritic steels such as nickel chromium steel.

During the heat soak phase, the metal is maintained in a humidified gaseous atmosphere similar or equivalent to that employed in the "shock heat" phase. Thus, the humidified gaseous atmosphere consists essentially of a nonreactive carrier gas and a reactive gas suitable for and in sufficient concentrations to achieve fluxing. In the preferred embodiment, the humidified gaseous atmosphere contains between about 50% and about 75% by volume hydrogen in nitrogen with trace amounts of water. Humidification of the gaseous atmosphere may be achieved by bubbling a hydrogen stream through water prior to admixture with nitrogen.

After metal fusion has been achieved, the resulting fused material is maintained in the humidified gaseous atmosphere and permitted to cool to a first lowered temperature greater than the austenitic phase transformation temperature of the non-ferritic steel for an interval sufficient to help maximize the temperature at which subsequent metallurgical transformation of the non-ferritic steel from an austenitic phase to a pearlite phase occurs. In the preferred embodiment, the fused metal material is maintained at this first lowered temperature for about four to eight seconds. This temperature is, preferably, greater than about 1,250° F. After reaching this first metallurgical transformation associated with a temperature of about 1,250° F. and a time interval of 4 to 8 seconds, the fused metal can be rapidly cooled in the controlled atmosphere to a second lowered temperature below which the non-ferritic metal enters the pearlite phase. In the preferred embodiment, this second lowered temperature is about 950° F. Without being bound to any theory, it is believed that this rapid cooling to the second lowered temperature is analogous to a metallurgical freezing. The term "freezing" as used herein defines a process which promotes a coarse grained crystal lattice structure in the non-ferritic steel. It is believed that this coarse grain structure improves the malleability of the resulting material.

After reaching this second lowered temperature, the fused metal can be cooled at a controlled rate in a nonoxidative atmosphere to a third lowered temperature below which the selected metal is not reactive with oxygen. Where copper is employed as the selected metal material, this third lowered temperature is below about 500° F. and preferably between the temperatures of about 350° F. and 500° F. Below this temperature, the selected brazed material, such as the copper, is not reactive with oxygen. This prevents undesired discoloration of the copper surface. At this point, the material can be safely removed from the controlled environment with little or no fear of oxidation or discoloration.

In order to facilitate ease of handling of the continuous double-walled tubing or other metal material, the material can, finally, be quenched in a suitable aqueous medium.

In order to further illustrate the process with regard to producing non-corrosive, double-walled tubing, reference is made to FIG. 1 which schematically depicts a tube forming process and line incorporating the process of the present invention.

In FIG. 1 is a production line 10 having a pay-off reel 12 which contains strips of non-ferritic steel with the selected metal being overlaid and mechanically, chemically or electrochemically attached to the non-ferritic steel surface.

The continuous sheet of non-ferritic steel is, preferably, between 0.25 and 0.35 millimeters thick and has a width suitable for producing a double-walled tube of an appropriate diameter. The length of the continuous strip is determined by handling constraints and requirement needs. The continuous strip (not shown) is advanced to a suitable roll form milling machine 14 which sequentially produces unbrazed, unsealed double-walled tubing. The tubing is immediately advanced to a volatilization station 16 which includes means for removing volatile portions of lubricating material employed during the milling steps (not shown).

In the preferred embodiment, the removing means employed in the volatilization station is a heating means which comprises a source 18 for anhydrous nitrogen gas and a heater (not shown). The heater can be any suitable heating means such as a resistance heater, an induction heater or a muffle furnace. In the preferred embodiment, an induction heater is employed. The induction heater is configured to permit the elevation to the volatilization temperature at or above 900° F. at a rate and for a period sufficient to permit effective volatilization of solvents and carriers employed in lubricating material employed during the milling process. In the preferred embodiment, as set forth in FIG. 1, any particular section of the continuous double-walled tube is exposed in the volatilization station 16 for a period between about 30 seconds and about five minutes. The tubing is, then, conveyed through a conduit (not shown) to the brazing station 20 upon exiting the volatilization station 16. The conduit and volatilization station 16 are equipped with suitable means for venting the volatilized solvents and introduced nitrogen gas in a suitable manner (not shown).

The brazing station 20 consists of heating means for rapidly rising the surface temperature of the continuous tube to an elevated temperature sufficient to trigger fusion between the non-ferritic steel and the selected metal layers thereon. Also included are means for providing a humidified gaseous atmosphere within the brazing station. The heating means can be either a resistance or an induction heater or any other suitable heater capable of essentially instantaneously raising the surface temperature of the nonferritic steel to a temperature at or above the brazing temperature for the selected metal layered thereon (not shown). The gas preferably employed is composed of a predominantly nitrogen atmosphere containing sufficient hydrogen to achieve and maintain fluxing. In the preferred embodiment, the gas is humidified by bubbling the hydrogen through a suitable bubbling tank (not shown). The gas is supplied in any conventional manner such as from gas bank 22 in FIG. 1.

Once the material has been shock heated in the brazing station 20, it is conveyed to a suitable heat soak station 24. The heat soak station 24 can be any type of heater capable of maintaining the double-walled tube at a temperature at or above a brazing temperature of about 2,050° F. In the preferred embodiment, the heat soak station 24 is an elongated muffle furnace. The heat soak station 24 is also supplied with the humidified gaseous mixture of hydrogen and nitrogen from the gas bank 22.

Upon exiting the heat soak station 24, the continuous metal tube has been fused into its leak-proof, double-walled state. At this point, it can be conveyed through a water-cooled jacket 26 to provide a controlled cool-down phase in which the elevated temperature is maintained at or above about 1,250° F. for a period sufficient to control grain size and structure to provide larger grain size for greater flexibility of the resulting tube. In general, each particular section of the continuous tube is exposed to the controlled cool-down phase for a period sufficient to maximize the temperature at which the non-ferritic metal transforms from austenitic through its transition phase into its pearlite phase. The initial controlled cool-down occurs immediately after the section of the continuous double-walled metal tube exits the heat soak station 24. This phase proceeds for a period of about three to six seconds. The continuous metal tubing is maintained in a controlled atmosphere and is, then, quickly cooled through its isothermal transformation state from its austenitic phase to its pearlite phase in a water-cooled jacket 26. This minimizes the time in which the material is in its transformation stage and maximizes the temperature at which the material exits that stage and enters into the pearlite phase. In the preferred embodiment, this occurs at approximately 950° F.

After this step is completed, the material is passed through an air cooling station 28 which can be comprised of a multiple fin-tubed heat exchanger. The tubing is maintained in a controlled atmosphere during the air cooling stage to prevent oxidation and discoloration of the fused copper material which would occur if it were exposed to oxygen. After the tubing reaches a temperature at or below 500° F., the material may be liquid quenched in the quench bath 30 to further reduce the latent heat to a point where the continuous metal tube can be easily handled. The material can then be exposed to air and be subjected to post-process stations such as testing stations 32, stretching stations 34, and eventually, a coiling station 36.

The process of the present invention permits the formation of unique brazed double-walled tubing from a copper plated strip. The tubing thus formed is comprised of a continuous latitudinal spiral of metal providing two thicknesses of the non-ferritic steel at any point through the circumference of the tube. The edges of the copper-plated non-ferritic steel strip are suitably shaped to permit the edges to sealingly conform to the contours of the associated external or internal surface of the tube. In this manner, the tubing can be brazed to provide a seamless seal, as well as continuous brazing around 360° of the double-walled metal tube. This tube is uniquely constructed in that the material of choice is a non-ferritic steel, such as nickel chromium steel which is brazed by the action of heating copper material plated thereon. The resulting tube is highly resistant to corrosion.

What is claimed is:

1. A process for brazing a selected metal alloy to a non-ferritic steel surface, the brazing process comprising the step of:
rapidly raising the temperature of the non-ferritic steel from a first temperature essentially equivalent to the volatilization temperature of any lubricating materials adhering thereto to an elevated brazing temperature sufficient to trigger fusion between the selected metal alloy and the non-ferritic steel surface, said temperature elevation occurring in a humidified gaseous atmosphere consisting essentially of a non-reactive carrier gas and a reactive gas suitable for and in sufficient concentrations to achieve fluxing, wherein said non-ferritic steel is maintained in contact with said humidified gaseous atmosphere at said brazing temperature for an interval sufficient to permit fusion between the selected metal alloy and the non-ferritic steel surface.

2. The process of claim 1 further comprising the step of:
after metal fusion has been achieved, allowing resulting fused metal material to cool to a first lowered temperature, said cooling occurring in a controlled non-oxidative atmosphere at a rate which maximizes the temperature at which metallurgical transformation of the non-ferritic steel from an austenitic to a pearlite phase occurs.

3. The process of claim 2 further comprising the step of:
rapidly cooling said fused metal in a controlled atmosphere to a temperature below which the selected metal alloy is not reactive with oxygen after reaching said metallurgical transformation point.

4. The process of claim 1 wherein said humidified gaseous atmosphere suitable for achieving fluxing consists essentially of nitrogen and sufficient hydrogen to achieve and maintain fluxing, said humidified gaseous atmosphere and said controlled gaseous atmosphere having a dew point greater than about −42° F.

5. The process of claim 1 further comprising the step of depositing the selected metal alloy over the surface of the non-ferritic steel prior to brazing.

6. The process of claim 5 wherein the selected metal alloy is electroplateable over the non-ferritic steel surface and said deposition step is an electroplating process.

7. The process of claim 1 wherein the non-ferritic steel consists essentially of iron, chromium, nickel, manganese, silicon, nitrogen, and carbon.

8. The process of claim 7 wherein the non-ferritic steel contains no more than 0.03% by weight carbon.

9. The process of claim 3 further comprising the step of quenching said fused metal in an aqueous medium after said fused metal has cooled to a temperature below said non-oxidative temperature of the selected metal alloy.

10. The process of claim 1 wherein said lubricating materials overlay said surface of the non-ferritic steel with the selected metal interposed therebetween, said lubricating compound consisting essentially of carbon and volatilizable solvents and carriers, wherein said volatilizable solvents and carriers are volatilizable at a temperature below about 900° F.

11. The process of claim 10 further comprising the step of:
elevating the temperature of the non-ferritic steel from a preliminary temperature substantially below said volatilization temperature to said volatilization temperature, said temperature elevation proceeding in the presence of a non-oxidative gaseous atmosphere at a rate sufficient to initiate an essentially instantaneous volatilization of volatilizable solvents and carriers present in said lubricating material.

12. A process for brazing at least two nonferritic steel surfaces to one another, the brazing process comprising the steps of:
rapidly raising the temperature of the non-ferritic steel surface from a first temperature to a brazing temperature greater than about 2,000° F. at a rate sufficient to initiate fusion between the non-ferritic steel surfaces and a selected brazeable metal deposited thereon in a humidified gaseous atmosphere consisting essentially of nitrogen and sufficient hydrogen to permit metal fluxing; and maintaining the non-ferritic steel surfaces and said selected brazeable metal in contact with said humidified gaseous atmosphere at said brazing temperature for an interval sufficient to permit uniform fusion between said selected brazeable metal and the surfaces of the non-ferritic steel.

13. The process of claim 12 further comprising the steps of:

after brazing has been achieved, maintaining said resulting fused metal material in said humidified gaseous atmosphere and allowing said fused metal material to cool to a first lowered temperature greater than about 1,250° F.;

upon reaching said first lowered temperature, metallurgically freezing said brazed material in the essentially crystalline configuration achieved at 1,250° F. by rapidly cooling said brazed material to a second lowered temperature less than about 950° F., said cooling step occurring in said humidified gaseous atmosphere.

14. The process of claim 13 further comprising the step of:

after reaching said second lowered temperature, cooling said fused metal in a controlled atmosphere to a third lowered temperature about 500° F., below which said brazed material is not reactive with oxygen.

15. The process of claim 12 further comprising the step of:

depositing a selected brazeable material on the respective non-ferritic steel surfaces to be brazed, said brazeable material selected from the group consisting of silver, copper, silver alloys, copper alloys and mixtures thereof prior to brazing the non-ferritic steel surfaces.

16. The process of claim 15 further comprising the steps of:

applying lubricating materials to said material formed in claim 15, said lubricating materials consisting essentially of carbon and a mixture of volatilizable solvents and carriers; and subjecting said lubricated material to metal deformation processes.

17. The process of claim 16 further comprising the steps of:

instantaneously volatilizing said volatilizable solvents and carriers in said applied lubricating materials by rapidly raising the surface temperature of said deformed material from essentially ambient to a volatilization temperature less than about 800° F. to about 900° F., said volatilization step occurring in a controlled non-reactive gaseous atmosphere; and maintaining said deformed material at said volatilization temperature for an interval sufficient to volatilize residual volatilizable solvent.

18. The process of claim 13 wherein said hydrogen is present in an amount between about 50% by volume and about 75% by volume of the gaseous mixture, and said gaseous atmosphere has a dew point greater than about −42° F.

19. The process of claim 13 wherein the non-ferritic steel consists essentially of iron, chromium, nickel, manganese, silicon, nitrogen, and carbon.

20. A process for producing a non-corrosive, seamless double-walled tubing comprising the steps of:

layering a selected metal on the surface of a sheet of non-ferritic metal, such that the selected metal overlays and is attached to said surface of the non-ferritic metal, the selected metal capable of forming a metallurgical bond with said surface of the non-ferritic metal under subsequent controlled conditions;

milling said metal sheet to sequentially form an unbrazed, unsealed continuous double-walled tube;

removing volatile portions of lubricating material employed during said milling steps from said surface of said continuous tube, said volatile portions consisting essentially of solvents and carriers;

rapidly raising the surface temperature of said continuous tube to an elevated temperature sufficient to trigger fusion between said non-ferritic steel and said selected metal layered there on, said temperature elevation occurring in a humidified gaseous atmosphere, said humidified gaseous atmosphere consisting essentially of at least one inert carrier gas and sufficient hydrogen to achieve and maintain fluxing;

maintaining said unsealed continuous tube in contact with said humidified gaseous atmosphere at said elevated temperature for an interval sufficient to permit fusion between said selected metal and said non-ferritic steel, forming a fused leak-proof, double-walled continuous metal tube;

after fusion between said selected metal and said non-ferritic metal has occurred, maintaining said resulting fused double-walled metal tube in said humidified gaseous atmosphere and allowing said fused continuous metal tube to cool to temperature in a first lowered temperature range, said first lowered temperature range being lower than said fusion temperature and higher than the temperature at which an initial metallurgical transformation of the non-ferritic steel from an austenitic phase to an intermediate phase occurs;

then, rapidly cooling said fused continuous metal tube to a temperature in a second lowered temperature range, said second lowered temperature range being lower than the temperature at which metallurgical transformation of said fused metal from said intermediate phase occurs; and after reaching said temperature in said second lowered temperature range, slowly cooling said fused continuous metal tube in a non-oxidative atmosphere to a third lowered temperature below which the selected metal fused on said continuous metal tube is not reactive with oxygen.

21. The process of claim 20 wherein said removal of volatile components of said lubricating materials further comprises the steps of:

elevating the temperature of said unsealed continuous tube from an essentially ambient temperature to a volatilization temperature, said volatilization temperature being sufficient to volatilize a substantial portion of said solvents and carriers present in said lubricating materials, said elevating step proceeding in the presence of a nonoxidative gaseous atmosphere at a rate sufficient to initiate an essentially instantaneous volatilization of said solvents and carriers present in said lubricating material.

22. The process of claim 21 wherein said elevation of the temperature of said continuous metal tube to said volatilization temperature occur essentially instantaneously.

23. The process of claim 21 wherein said volatilization temperature is between about 700° F. and about 900° F.

24. The process of claim 20 wherein said elevated temperature sufficient to trigger fusion between the nonferritic steel and the selected metal layered thereon is greater than the melting point of the selected metal.

25. The process of claim 20 wherein said elevated temperature sufficient to trigger fusion between the nonferritic steel and the selected metal layered thereon is greater than about 2,050° F.

26. The process of claim 20 wherein said second lowered temperature is less than about 950° F.

27. The process of claim 20 wherein said hydrogen is present in an amount between about 50% by volume and about 75% by volume of the gaseous mixture and said gaseous atmosphere suitable for maintaining fluxing has a dew point greater than about −42° F.

28. The process of claim 20 wherein the metal capable of being electroplateable over non-ferritic steel is selected from the group consisting of copper, silver, copper alloys, silver alloys, and mixtures thereof.

29. The process of claim 28 wherein the non-ferritic steel consists essentially of iron, chromium, nickel, manganese, silicon, nitrogen, and carbon.

30. The process of claim 29 wherein the non-ferritic steel contains no more than 0.03% by weight carbon.

31. The process of claim 30 wherein said third lowered temperature is less than about 500° F.

32. The process of claim 31 further comprising the step of:

exposing the non-ferritic steel to ambient temperature prior to raising the surface temperature of the non-ferritic material to said elevated temperature, said exposure occurring for an interval sufficient to permit removal of said non-oxidative gaseous atmosphere.

* * * * *